(Model.)
H. J. EISEN.
Stem Winding and Setting Watch.
No. 235,941. Patented Dec. 28, 1880.
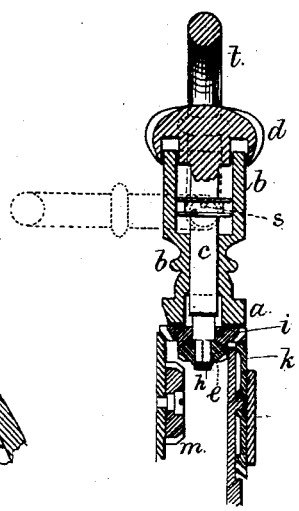
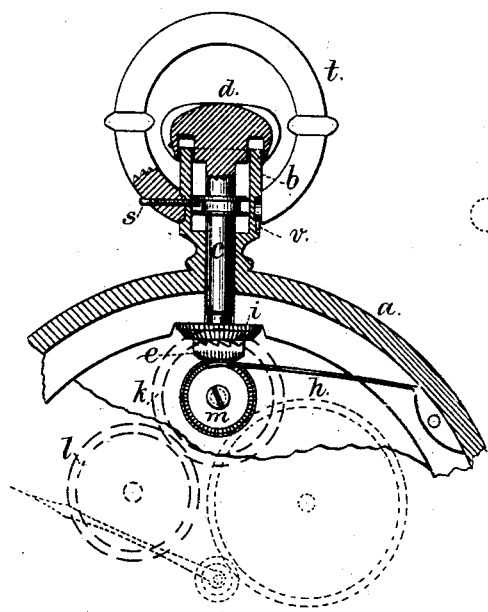
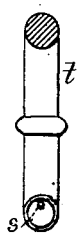
Witnesses
Chas. H. Smith
Harold Serrell
Inventor
H. J. Eisen,
per Lemuel W. Serrell
Atty

UNITED STATES PATENT OFFICE.

HERMANN J. EISEN, OF GENEVA, SWITZERLAND, ASSIGNOR TO ARNOLD FRANKFELD, OF SAME PLACE.

STEM WINDING AND SETTING WATCH.

SPECIFICATION forming part of Letters Patent No. 235,941, dated December 28, 1880.

Application filed May 12, 1880. (Model.)

*To all whom it may concern:*

Be it known that I, HERMANN JOSEPH EISEN, watchmaker, of Geneva, Switzerland, have invented an Improvement in Stem Winding and Setting Watches, of which the following is a specification.

Watches have been made with a coronated stem that is revolved in winding or setting.

My improvement relates to mechanism whereby the winding mechanism is disconnected from the stem by the swinging aside of the ring and the stem connected by the same movement with the wheels that set the hands. By this improvement it is unnecessary to operate any push-pin or similar device when setting the hands.

In the drawings, Figure 1 is a section in larger size of the shank and rim of the watch in a plane at right angles to the watch-case center. Fig. 2 is a partial section of the same parts in the plane of the watch-center, and Fig. 3 is a section of the ring separately.

The watch-case center or rim, $a$, is of usual character, and the lids, watch-plates, and works form no part of my invention.

The shank $b$ is at one side of the watch-case center, as usual, and it is hollow for the stem $c$, that extends from the coronated head $d$ to the small gear $e$, the stem being polygonal where it enters said wheel $e$, so as to turn the same. There is a bevel-gear wheel, $i$, around the stem $c$, between the wheel $e$ and the inner surface of the watch-case, and there are ratchet-teeth on the adjacent faces of the wheels $i$ and $e$, and the spring $h$ tends to keep these ratchet-teeth interlocked with each other.

The wheel $i$ gears with the wheels $k$ $l$, that act upon the arbor of the spring-barrel to wind the same. These wheels $i$ $k$ $l$ are similar to those that are used in some stem-winding watches. As the crown $d$ is turned back the ratchet-teeth cause the wheel $e$ to press against the spring and the inclines of the ratchet-teeth slip past each other, so that no force can be applied to turn the winding-wheels the wrong way.

There are gear-wheels between the hands and the wheel $m$. These gears may be of any desired character, and the wheel $e$ does not come into contact with this wheel $m$ when the crown $d$ is being turned in either direction in winding the watch; but in order to set the watch I give to the stem an end movement that is sufficient to carry the wheel $e$ farther into the watch against the action of the spring $h$ until the teeth of the wheel $e$ gear with the teeth of $m$, so that the hands may be moved to set the watch by revolving the coronated head of the stem. This inward movement of the wheel $e$ disconnects the ratchet-teeth thereof from the teeth of the wheel $i$, and in order to prevent the coronated head being pushed in accidentally, and also to hold the setting mechanism in gear, I make use of an eccentric-pin, $s$, entering a peripheral groove in the stem $c$, such pin $s$ projecting inwardly from the journals of the ring or pendant $t$, and being eccentric to such journals, as seen in Fig. 1 and in the detached sectional view, Fig. 3, so that when the ring is in the same plane as the watch-case the stem cannot be pushed in; but when the ring is turned aside into the position shown by dotted lines the eccentric-pin $s$ will allow sufficient end motion being given to the stem to connect the wheels $e$ and $m$ and allow the hands to be turned by the coronated stem. To prevent the ring swinging aside accidentally I use a pin, $v$, upon the ring, entering a double-inclined or V-shaped recess in the side of the shank, so that the ring can only be turned aside when sufficient power has been applied to spring the ring as the pin passes out of the V-shaped recess.

I claim as my invention—

1. The combination, with the winding and setting wheels and the gears $e$ and $i$, of the spring $h$, the stem $c$, and coronated head, the eccentric-pin $s$, entering a groove in the stem $c$, and the ring $t$, into which the pin is inserted, as set forth.

2. The combination, in a stem-winder, of the shank $b$, ring $t$, pin $v$, entering a recess in the shank, the eccentric-pin $s$, the stem $c$, with a peripheral groove, the gears $e$ and $i$, and the gearing to the hands and barrel, respectively, substantially as set forth.

In testimony whereof I have signed my name to this specification in the presence of two subscribing witnesses.

HERMANN JOSEPH EISEN.

Witnesses:
A. FRANKFELD,
KATE S. O'HARA.